March 20, 1934.　　　H. M. LEWIS　　　1,952,031

POWER FACTOR CORRECTION

Filed April 7, 1931　　　2 Sheets-Sheet 1

Inventor
Harold M. Lewis
By his Attorney
Clyde A. Norton

March 20, 1934.  H. M. LEWIS  1,952,031
POWER FACTOR CORRECTION
Filed April 7, 1931  2 Sheets-Sheet 2

Inventor
Harold M. Lewis
By his Attorney
Clyde A. Norton

Patented Mar. 20, 1934

1,952,031

UNITED STATES PATENT OFFICE 1,952,031

POWER FACTOR CORRECTION

Harold Miller Lewis, Douglaston, N. Y.

Application April 7, 1931, Serial No. 528,315

11 Claims. (Cl. 172—246)

This invention relates to the correction of power factor in electrical systems by means of vacuum tubes. More broadly it relates to utilizing an arrangement of vacuum tubes operating as a synchronous source of energy and used in conjunction with a practical electrical impedance to replace a theoretically desirable impedance.

In the case of power factor correction it has previously been the practice to utilize a condenser in conjunction with a load which is inductive for the purpose of drawing a leading current from the power lines to correct for the lagging current drawn by the inductive load. The cost of electro-static condensers is such that they are used only where careful analysis shows that the saving in power costs will be sufficient to justify their installation. Over-excited synchronous machines are also used in synchronous condensers but these too are expensive and hence it is the practice to correct power factor in cases of major importance only.

Similarly other cases occur in which a theoretically desirable impedance is not economically feasible. It may often occur in the design of electrical apparatus and systems that a capacity reactance is wanted where it is only practical to install an inductance, or the reverse may be the case. Similarly a pure resistance may be wanted where a capacitive or inductive impedance may be more economically installed. A particular case may require some combination or general impedance where some other combination or impedance is more feasible in practice. It is to the solution of this type of problem that my invention is directed, whereby an ideal impedance is simulated by some other impedance plus the synchronous electrical output energy of vacuum tubes; this output energy being controlled or predetermined in amplitude and in phase.

Another object of my invention is to provide for the tuning of electrical circuits, as for example radio circuits, by circuit impedances not normally used. As an example an inductance normally tuned to resonance by a capacity by my invention may instead be tuned by an inductance (or by a resistance) plus the synchronous energy of proper amplitude and phase from thermionic vacuum tubes.

My invention will however be better understood by reference to the drawings, in which Figures 1, 2 and 3 illustrate the theory of replacing an impedance by some other impedance plus a synchronous source of voltage of proper amplitude and phase.

Figure 7 shows a more simple arrangement of a vacuum tube to correct power factor while

In the following specification I have used the term "exciting" to designate the control or input voltage applied to the control grid or to the input circuit of the vacuum tube, and I have used the term "energizing" to designate the direct current potentials employed to serve as the $a$, $b$ and $c$ voltages applied to produce operation of the tubes.

Figure 1:
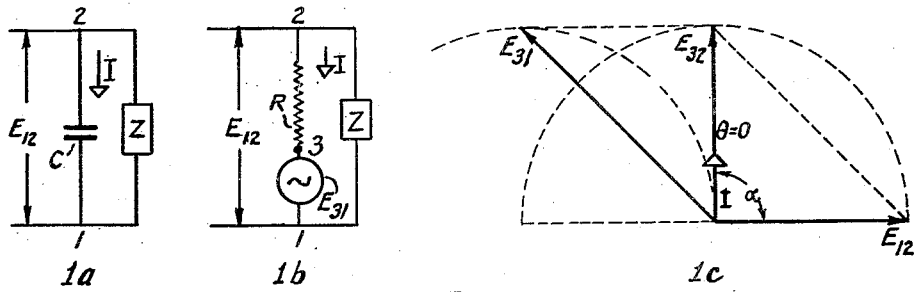

In Fig. 1a is shown a single phase circuit of voltage $E_{12}$ supplying a load Z which is assumed to be inductive. Across the line a capacity C is connected to draw a leading current I to correct the power factor of the circuit in the well known manner. In Fig. 1b the arrangement is the same except that the capacity C has been replaced by a resistance R and a synchronous voltage source $E_{31}$; the phase and amplitude of the voltage $E_{31}$ being so determined that I remains unchanged. That $E_{31}$ may be so determined can be shown as follows:

In Fig. 1a $$I = \frac{E_{12}}{-jX_c} \text{ where } X_c = \frac{1}{2\pi f c}$$

In Fig. 1b $$I = \frac{E_{32}}{R} = \frac{E_{12} + E_{31}}{R}$$

$$\therefore E_{31} = -E_{12}\left(1 - j\frac{R}{X_c}\right)$$

The vector diagram Fig. 1c shows the plot of voltages and current as called for in the above equations where R has been chosen numerically equal to $X_c$. The current I leads the voltage $E_{12}$ by the phase angle $\alpha$ of 90 degrees. I is in phase with the voltage $E_{32}$ since R is a pure resistance. $E_{31}$ is the required additional synchronous voltage in order that R may simulate the capacity C.

Figure 2:
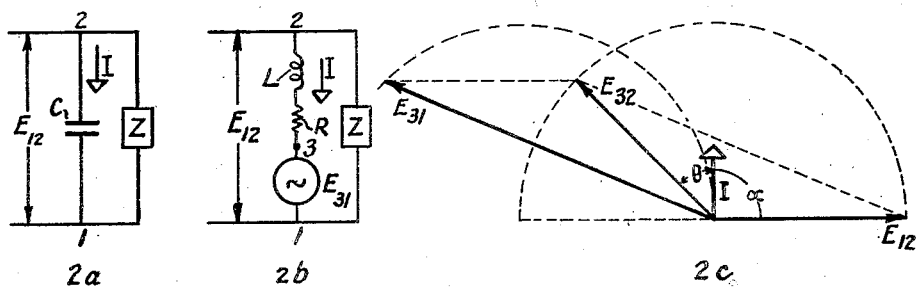

In Fig. 2a we again have the voltage $E_{12}$ supplying a reactive load Z and a capacity C again drawing a leading current to correct powerfactor. In Fig. 2b however the capacity C is replaced by an impedance L and R and a synchronous source of voltage $E_{31}$ of predetermined amplitude and phase such that the current I is the same in both cases (i. e., has the same amplitude and leads the line voltage $E_{12}$ by 90 degrees in both arrangements of Fig. 2). That $E_{31}$ may be so determined so that this result obtains is evident from the following:—

In Fig. 2a $$I = \frac{E_{12}}{-jX_c} \text{ where } X_c = \frac{1}{2\pi fc}$$
$$X_L = 2\pi fL$$

In Fig. 2b $$I = \frac{E_{32}}{R+jX_L} = \frac{E_{12}+E_{31}}{R+jX_L}$$

$$\therefore E_{31} = -E_{12}\left[\left(1+\frac{X_L}{X_c}\right) - j\frac{R}{X_c}\right]$$

The diagram Fig. 2c shows the vectors of current and voltages as called for by the above equation for the case where the impedance of the branch R, L is numerically equal to the reactance of C. The current leads the line voltage $E_{12}$ by 90 degrees and lags behind the voltage $E_{32}$, and $E_{31}$ is the additional synchronous voltage necessary so that the impedance L, R may simulate the capacity C for which it is substituted.

Figure 3:
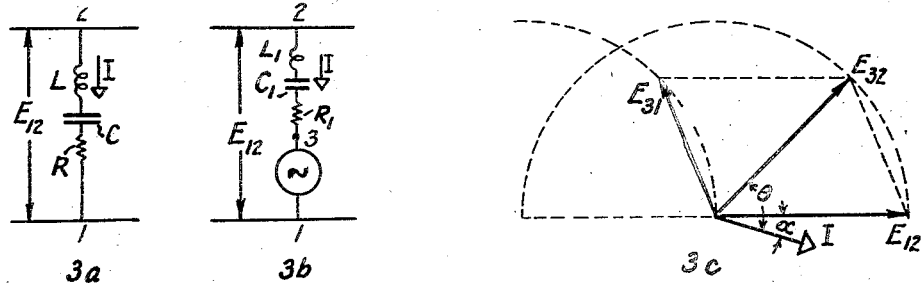
Figure 3:
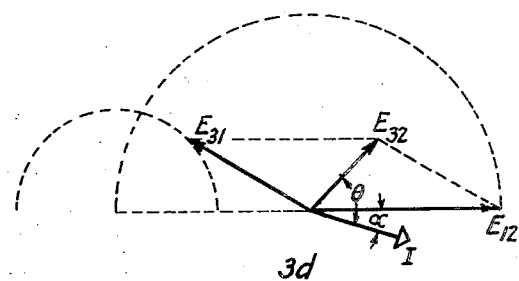

Fig. 3a shows a single phase alternating voltage $E_{12}$ impressed across an impedance consisting of L, C and R and a current I flows as, for example, in Fig. 3c and Fig. 3d lagging the impressed voltage $E_{12}$ by the phase angle $\alpha$. It is desired to replace the impedance of Fig. 3a by another as in Fig. 3b having circuit constants $L_1$, $C_1$ and $R_1$ so that the same current I having the same phase relative to $E_{12}$ still will flow. To accomplish this it is necessary to supply the synchronous voltage $E_{31}$ of proper amplitude and phase. For this general case the relations are as follows:

In Fig. 3a $$I = \frac{E_{12}}{R+jX} \text{ where } X = (X_L - X_c)$$
$$X_1 = (X_{L1} - X_{c1})$$

In Fig. 3b $$I = \frac{E_{32}}{R_1+jX_1} = \frac{E_{12}+E_{31}}{R_1+jX_1}$$

$$\therefore E_{31} = E_{12}\left[\left(\frac{R(R_1-R)+X(X_1-X)}{R^2+X^2}\right) + j\left(\frac{R(X_1-X)-X(R_1-R)}{R^2+X^2}\right)\right]$$

In the diagram Fig. 3c vector relations as would be required by the above equations are shown for the case where the impedance of Fig. 3a is inductively reactive and is replaced by the impedance of Fig. 3b which is different but is also inductively reactive. The current remains the same in both cases and is shown to lag the line voltage $E_{12}$ by the phase angle $\alpha$. The voltage $E_{32}$ required for the substituted impedance is obtained by supplying the synchronous voltage $E_{31}$ of amplitude and phase as shown. For this case the substituted impedance is numerically equal to the one it replaces. In Fig. 3d the substituted impedance is numerically less than the one of Fig. 3a which it replaces. The voltage $E_{32}$ across the new impedance is therefore less than in Fig. 3c and the required synchronous voltage $E_{31}$ is therefore as shown.

It will be clear from the three examples given that with a synchronous voltage source which is adjustable as to amplitude and phase we may substitute for a desired impedance some other more convenient impedance together with this synchronous voltage and thereby realize the benefits of the desired impedance. The thermionic vacuum tube is an instrument which because of its amplifying and other properties may readily be connected to serve as a synchronous voltage source of controlled amplitude and phase. My invention comprises the use of such amplifying vacuum tubes to serve as synchronous voltage sources as the voltage $E_{31}$ of Figures 1, 2 and 3.

Figure 4:
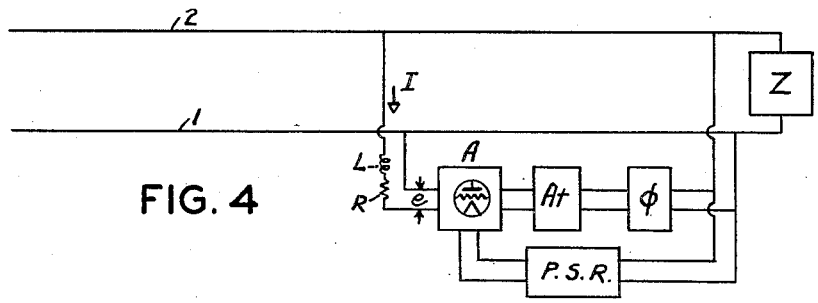
Figure 4 shows a symbolic arrangement of apparatus for correcting power factor in a single phase circuit.

Figure 4 shows in symbolic form the general manner of utilizing vacuum tubes for power factor correction. A single phase line 1, 2 supplies a load Z which is assumed to be inductively reactive and it is desired to place an impedance in shunt with the line which will draw a leading current I for power factor correction. The shunt circuit shown for accomplishing this purpose is the output circuit of a vacuum tube amplifier and consists of the inductance L, resistance R together with impedance introduced by the vacuum tube into this circuit and a synchronous voltage $e$ of proper amplitude and phase so that the current I flowing in the branch leads by the desired amount the line voltage all in the manner as described in the three preceding figures, particularly Fig. 2. In accordance with my invention the power to operate the amplifier A is derived from the line 1, 2 by means of a rectifier labeled P. S. R. which converts the alternating current obtained from the line to direct current to energize the electrodes of the vacuum tube amplifier A. The input of the amplifier A is excited in synchronism by voltage from the line being supplied to its input circuit via the phase rotor $\phi$ and attenuator or voltage regulator $At$, whereby the output voltage is determined as to frequency, amplitude and phase. The apparatus $\phi$ and $At$ may also be of the vacuum tube type in which case the power supply rectifier P. S. R. would also be arranged to energize these units as is shown in the next figure. It will be clear that proper meters may be connected in the circuit to indicate when the best power factor is obtained thru the adjustment of $\phi$ and $At$.

Figure 5:
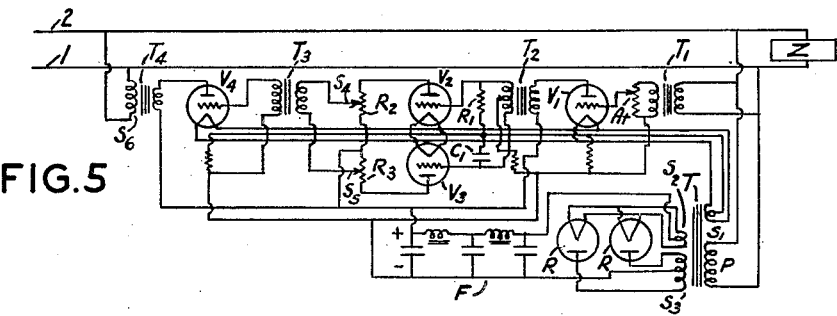
Figure 5 shows a circuit employing three element thermionic vacuum tubes for correcting power factor in a single phase line.

Fig. 5 is a circuit diagram of apparatus such as diagrammatically shown in Fig. 4. The line 1, 2 has for its load the impedance Z and the transformer T with primary winding P and secondary windings $S_1$, $S_2$ and $S_3$. $S_1$ supplies energy to heat the cathodes of the vacuum tubes $V_1$, $V_2$, $V_3$ and $V_4$. $S_2$ similarly energizes the cathodes of the rectifier tubes R, R and $S_3$ supplies high voltage alternating current to their plates. The arrangement of the rectifier tubes and filter F is well known and it is sufficient to say that the output of the filter F is a steady source of direct current which serves to furnish D. C. potentials for the plate and grid electrodes of the vacuum tubes. The vacuum tube amplifiers $V_1$, $V_2$, $V_3$ and $V_4$ thus being energized operate as follows. The vacuum tube $V_1$ is excited, or has its input or grid circuit supplied, by an alternating voltage derived from the line via the transformer $T_1$. The amplitude of the exciting voltage is set or controlled by the potentiometer or attenuator $At$. Hence its output voltage and the final voltage output of the system is determined by adjusting $At$. The output of $V_1$ is applied to the input circuits of vacuum tubes $V_2$ and $V_3$ by the transformer $T_2$ and impedance branch $R_1$ and $C_1$. The branch $R_1$ and $C_1$ is a simple phase spliting arrangement, the values being selected so that the voltage developed across R, is in quadrature with that developed across $C_1$. The output circuits of $V_2$ and $V_3$ contain the resistances $R_2$ and $R_3$ respectively and hence the amplified output voltages of these tubes as developed across these resistors are in quadrature. These quadrature voltages are applied to the input of the final power amplifier tube $V_4$ (or tubes if need be), thru the sliding contacts $S_4$ and $S_5$ and the transformer $T_3$. It will be clear that the input voltage to $V_4$ is determined in phase by the positions of $S_4$ and $S_5$ since by their adjustment the quadrature voltages from $R_2$ and $R_3$ are selected to add algebraically to give a resultant voltage of any phase desired between limits of 90 degrees. It will be clear that by the further poling of transformer $T_3$ or by inserting additional transformers in the plate circuits of tubes $V_2$ and $V_3$ to change by 180 degrees the voltages developed across the resistors $R_2$ and $R_3$ any desired phase may be given the voltage applied to the input of $V_4$. Such a complete arrangement of phase rotation is however seldom necessary and hence the more limited arrangement has been illustrated but in any event it will be understood that I do not limit myself to the particular method of phase rotation described as the art offers a large variety of phase rotators which are suitable to the purpose. The output of $V_4$ is therefor a voltage of line frequency and determinable in amplitude and phase by the instrumentalities described and is applied to the line thru the transformer $T_4$. The shunt path which is to simulate a capacity for power factor correction is then in this case the secondary impedance of the transformer $T_4$ and the synchronous voltage developed in the secondary winding as effected by the tube $V_4$. The shunt path $S_6$ with its synchronous voltage therefor operates to draw a leading current from the line as explained in Figs. 1, 2 and 3 and hence serves for power factor correction by simulating a capacity.

Figure 6:
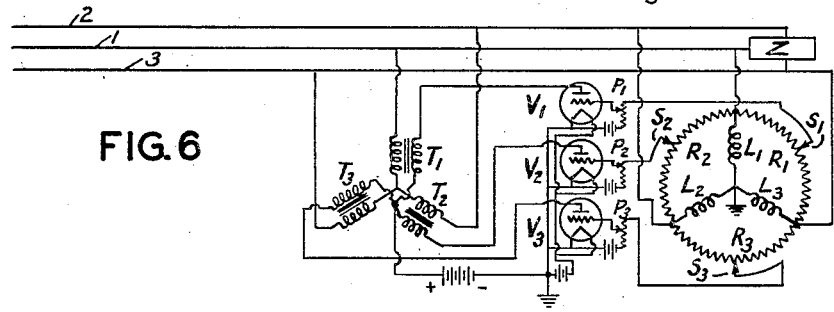
Figure 6 shows a three phase circuit with vacuum tubes arranged to correct power factor.

Coming now to Fig. 6, a vacuum tube arrangement for the power factor correction of a three phase circuit is shown. For convenience of illustration the vacuum tubes are here shown to be energized by batteries but it will be clear that suitable rectifying circuits deriving their energy from the three phase circuit may be employed, as was the case for the single phase circuit of Fig. 5. The line 1, 2, and 3 supplies a load Z and also the network consisting of similar symmetrical elements of inductance $L_1$, $L_2$, and $L_3$ and resistances $R_1$, $R_2$ and $R_3$. Sliding contacts $S_1$, $S_2$ and $S_3$ serve to apply voltage of the line frequency and proper phase to the input of grids of the three vacuum tubes $V_1$, $V_2$ and $V_3$ respectively by means of the three potentiometers or attenuators $P_1$, $P_2$ and $P_3$. The output of the vacuum tubes is developed by the three phase transformer having three symmetrical branches $T_1$, $T_2$ and $T_3$ and by them reapplied to the line. It will be clear that sliding contact $S_1$ along the resistance $R_1$ will continuously vary the phase of the voltage applied to $P_1$ by any amount desired between the values by which conductor 1 differs in phase from conductor 2. And continuing to move the slider $S_1$ around the circle of resistances will permit the phase of voltage applied to $P_1$ to be any value whatever. Similarly the voltage applied to $P_2$ is determinable by positioning $S_2$ and the positioning of $S_3$ determines the phase of voltage applied to $P_3$. Likewise adjusting $P_1$, $P_2$ and $P_3$ determines the amplitude of voltages applied to $V_1$, $V_2$ and $V_3$ and hence by adjustment of these elements the three-phase output of the circuit as it is applied back to the line is determined in both amplitude and phase. If the load Z is balanced then it may be desirable to arrange a common control knob by which the three sliders may be simultaneously adjusted and also a common control knob for the three potentiometers by which the amplitude of each phase can be simultaneously adjusted. It will be clear from the descriptions given for the single phase cases of the preceding figures that each phase of the line is supplied with an impedance to ground (or if preferred, an impedance between it and each other phase) which is not normally a capacity but which is made to simulate a capacity because of the synchronous voltage output of the vacuum tubes being supplied to that impedance in proper amplitude and phase so that a leading current flows from the line. Only the essential elements for the circuit have been shown and one example of polyphase input and output networks given but it will be clear to those skilled in the art that many other types of polyphase networks may be used and other forms of phase rotators than that shown may be applied and many of the well known refinements of the vacuum tube art added to improve the efficiency and operation of the system without departing from the spirit of my invention.

Figure 7:
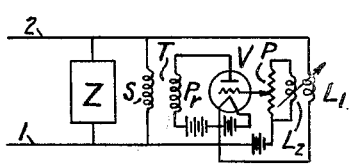

In Fig. 7 a relatively simple arrangement is shown for power factor correcting or impedance simulation. The alternating current circuit 1, 2 is applied to a load Z and at the same time excites the grid of the vacuum tube V by means of the coupling arrangement of inductances $L_1$, $L_2$ and potentiometer P. The output of the vacuum tube V is applied to the shunt S across the line by virtue of the fact that S is the secondary of the transformer T whose primary $P_r$ is in the plate circuit of V. Plate, filament and grid voltages are indicated as being supplied by batteries. The amplitude of the synchronous voltage supplied to the shunt circuit S is determined by the adjustment of P and the phase varied between a somewhat limited range by the poling and adjustment of coupling between $L_1$ and $L_2$ which is indicated by the arrow to be variable. The shunt path S may therefore be given any simple impedance characteristic as determined by its own effective resistance and inductance and by the amplitude and phase of the synchronous output voltage applied to it by V. The arrangement shown in this figure is more simple than that of Fig. 5 but also more limited in that all action depends upon a single vacuum tube. In it, however, all of the elements of Fig. 4 are present.

Figure 8:
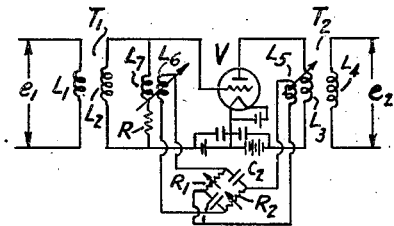
Fig. 8 shows apparatus by which resonance or tuning in a vacuum tube amplifying stage may be accomplished by tuning an inductance with another inductive impedance plus the synchronous voltage from the vacuum tube.

Fig. 8 is an application of the principle of impedance simulation by some other impedance and a synchronous voltage for a vacuum tube amplifying stage and the amplifying properties of the stage are utilized for the double function of amplifying the input voltage, applying it to the output for some useful purpose and also utilizing the output amplified voltage as a synchronous source to effect resonance in the input circuit. The input voltage $e_1$ is applied thru the transformer $T_1$ to the grid or input circuit of the tube V. The output voltage is developed by the transformer $T_2$ having primary winding $L_3$ and secondary windings $L_4$ and $L_5$ so that an amplified replica of $e_1$ is delivered to the output circuit as $e_2$. Across the input or grid circuit is an inductive impedance $L_7$, R which it is desired shall simulate a capacity by drawing a leading current so that it effectively tunes the secondary inductance $L_2$ of the transformer $T_1$ to resonance just as would be the case if a variable capacity had been used and adjusted to resonate the grid circuit to the frequency of the applied voltage $e_1$. The reactive branch $L_7$, R must, according to the theory which has been given, be supplied with a synchronous voltage of properly determined amplitude and phase. This is accomplished by utilizing some of the amplified output developed across the secondary $L_5$, the coupling of which is adjustable with the primary $L_3$. The output of $L_5$ is applied to the phase rotator which consists of a bridge arrangement of capacities $C_1$, $C_2$ and $R_1$, $R_2$ which is one of many possible phase rotating arrangements. The resistors $R_1$, $R_2$ are shown to be variable and by their adjustment the output is a voltage of whatever phase is desired. The output of the phase rotator is therefore a synchronous source of voltage applied to the branch $L_7$ R of proper amplitude and phase so that a leading current flows thru this branch in proper amount to simulate a capacity to resonate with the inductance $L_2$. It is therefore clear that resonance of the input circuit of the tube V is accomplished by other impedances than those usually employed. It will be understood that the single amplifying stage shown may be one of a series as for example in a cascade amplifier for radio reception or for transmission. And it will also be clear that a normally capacitive branch may in a similar way be made to simulate an inductance to tune or resonate with a capacity. The advantages and other applications of the synchronously tuned amplifying stage depicted in this figure will be evident to those skilled in the art.

I claim:

1. The method of simulating a desired impedance in an alternating current circuit, which comprises controlling an electron stream from said alternating current circuit, passing the current carried by said electron stream through an impedance in said circuit and adjusting the amplitude independently of phase and phase independently of amplitude of the current carried by said electron stream to simulate the desired conditions.

2. In combination with an alternating current supply system, alternating current conducting lines supplying a load circuit having appreciable inductive reactance, a rectifier connected to said lines to produce direct current, a plurality of vacuum tubes, means for supplying operating voltages to said vacuum tubes from said direct current, means for supplying input voltage to said vacuum tubes from said lines, means for applying the alternating voltage output of said vacuum tubes to said lines through an impedance across said lines, and further means for adjusting the amplitude and phase of said output voltage to produce any desired phase relation between the voltage across said impedance and the current flowing therein.

3. In combination, a source of alternating current energy, lines for supplying said energy to a work circuit, means including vacuum tubes for improving the power factor of said circuit, means connected to said line for supplying input voltages to said tubes from said line including one means for determining the phase and another means for determining the amplitude of said input voltages and rectifiers associated with said lines to serve as a source of operating voltages for said vacuum tubes.

4. In combination, an alternating current transmission system, means for producing the equivalent of an inductive or a capacity reactance in said system, said means including an electron discharge device, means comprising a phase adjusting and amplitude adjusting circuit for supplying operating voltages from said system to said discharge device and means for supplying the losses in said first mentioned means from said system.

5. In combination with an alternating current power line, a circuit in shunt with said line and means for predetermining the magnitude and phase of current in said circuit relative to the voltage across said line, comprising an electrical discharge device having an anode, a cathode and a grid, means for applying voltage from said line to said grid, means for adjusting the amplitude and phase of the voltage at said grid and means for supplying the losses in said device from energy derived from said line.

6. In combination, an alternating current transmission line, a pair of thermionic tubes having input control elements and output elements, means for obtaining quadrature voltages from said line, means for applying said voltages in quadrature to the control elements of said pair of tubes, means for combining the energy from said output elements to provide a source of alternating voltage of line frequency and of desired amplitude and phase, and means for applying said voltage to said line through an impedance to determine the phase and amplitude of current flowing in said impedance.

7. In combination with a power line source of substantially a single frequency supplying energy to a load circuit, a static synchronous impedance operatively connected to said line, said impedance comprising thermionic tubes having input and output circuits, said input circuits including means applying voltage of said frequency from said line, in adjusted amplitude and in adjusted phase as control voltages to said tubes, and means including a rectifier for supplying from said power line the losses in said impedance.

8. In combination with a power line source of substantially a single frequency supplying energy to a load circuit, a static synchronous condenser operatively connected to said line, said condenser comprising thermionic tubes having input and output circuits, said input circuits including means applying voltage of said frequency from said line, in adjusted amplitude and in adjusted phase as control voltages to said tubes, and means including a rectifier for supplying from said power line the losses in said condenser.

9. In combination with a polyphase transmission line, a circuit for improving the power factor thereof which comprises a polyphase arrangement of electrical discharge tubes, means for controlling one of each of said tubes by a voltage corresponding to a phase of said line, means for adjusting the amplitude and phase of said voltage in each case relative to the line phase voltage to which it corresponds, and means comprising a polyphase impedance associated with said line and with the output of said tubes to simulate a synchronous polyphase impedance.

10. The method of simulating a desired impedance in an alternating current circuit, which comprises controlling an electrical discharge stream from said alternating current circuit, utilizing the current carried by said stream to control the current in an impedance in said circuit, and adjusting the amplitude substantially independently of phase and the phase substantially independently of amplitude, of the current in said impedance relative to the voltage across it.

11. The method of simulating a desired impedance in an alternating current circuit which comprises deriving a voltage from said circuit, adjusting the phase of said voltage substantially independently of the amplitude thereof, adjusting the amplitude thereof substantially independently of phase thereof to provide a source of control voltage, applying said control voltage to an electrical discharge stream, and utilizing said discharge stream to control the current in an impedance in said circuit relative to the voltage across said impedance.

HAROLD MILLER LEWIS.